W. M. WALTMAN.
PIPE CONNECTION FOR JUNCTION BOXES AND THE LIKE.
APPLICATION FILED APR. 29, 1919.
1,343,877.
Patented June 15, 1920.
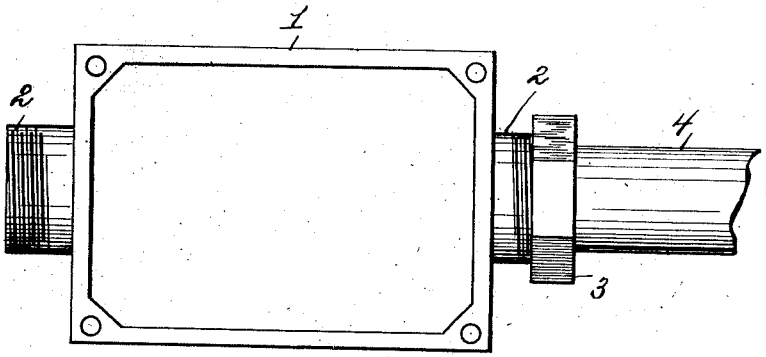
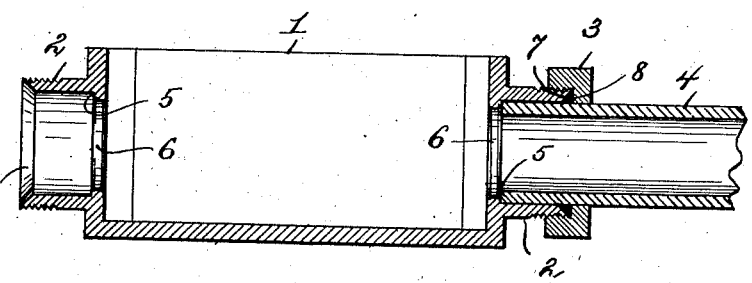
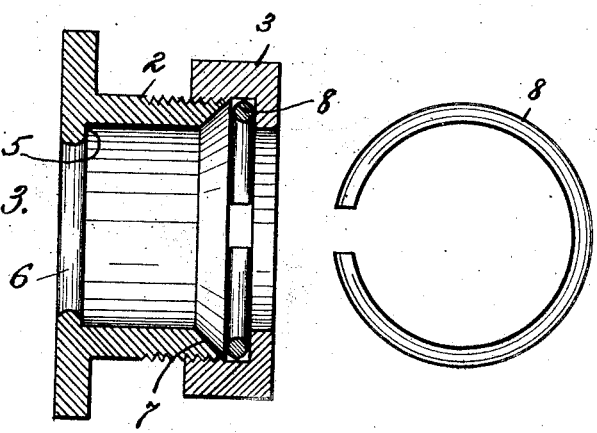 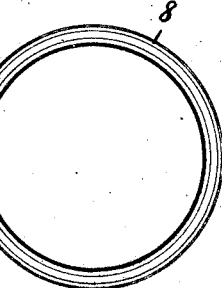
INVENTOR
Walter M. Waltman
BY
Fredk C. Fischer
ATTORNEY

UNITED STATES PATENT OFFICE.

WALTER M. WALTMAN, OF WEST NEW BRIGHTON, NEW YORK, ASSIGNOR TO RAYMOND S. HART, OF NEW YORK, N. Y.

PIPE CONNECTION FOR JUNCTION-BOXES AND THE LIKE.

1,343,877.     Specification of Letters Patent.     Patented June 15, 1920.

Application filed April 29, 1919. Serial No. 293,539.

*To all whom it may concern:*

Be it known that I, WALTER M. WALTMAN, a citizen of the United States, residing at West New Brighton, in the county of Richmond and State of New York, have invented certain new and useful Improvements in Pipe Connections for Junction-Boxes and the like for the Distribution of Electric Wires; and I do hereby declare that the following is a full, clear, and exact description of the same, reference being had to the accompanying drawings, and to the numerals of reference marked thereon, which form a part of this specification.

My invention relates to an improved pipe connection for a junction box or the like and the object of my invention is to provide improved means in which a pipe or cable may be suitably secured.

The construction and operation of my device will be more fully described in the specification which follows, and in the drawings which form a part thereof, wherein I have shown a preferred embodiment of my invention in a junction box, provided with outwardly extending nipples in which the ends of pipes or conduits are secured.

Throughout the specfication and drawings, like reference numerals are employed to indicate corresponding parts, and in the drawings, Figure 1, represents a plan view of my improved device, the cover thereof not being shown.

Fig. 2, represents a central longitudinal section thereof.

Fig. 3, represents on an enlarged scale, a section of a flanged nipple, a nut and an open ring; and Fig. 4, represents a plan view of the open ring.

In the drawings, 1 represents a cast iron junction box which may be of any desired shape, the same being provided with two outwardly extending nipples 2—2, exteriorly screw-threaded to receive the locking nut 3 which has screw-threaded engagement therewith.

A pipe 4 is shown one end of which is secured in the bore of the nipple 2 and resting against a shoulder 5 located in said nipple, adjacent to the aperture 6 which for practical purposes is provided with a indicated in the drawings, is provided with a beveled seat 7 designed to receive the open metallic ring 8 which, by means of the nut is forced into intimate engagement with said seat and around the pipe when said nut is screwed upon the screw-threaded portion of the nipple 2, thereby firmly securing the end of the pipe within the nipple, see Fig. 2.

As previously stated the open ring 8, is preferably made from metal, but experience has demonstrated that other suitable material such as leather may be employed.

In practice I prefer to use a ring made from round wire, although wires of different cross sections, as for instance, square, elliptical and other shapes have been found very satisfactory.

Heretofore, in junction and outlet boxes it has been customary when it was desired to secure a pipe within an extension formed on said box or in an aperture therein, to thread the aperture or said extension and to correspondingly thread the end of said pipe in order that the said pipe has screw-threaded engagement therewith.

By the employment of an open ring, and the provision of a beveled seat on the end of the nipple I am enabled to dispense with the threading of the pipe thereby greatly facilitating the making of a pipe connection, in a junction box or the like.

In boxes which are not provided with integral nipples, a flanged nipple, such as is illustrated in Fig. 3 of the drawings, may if desired be secured to any flat surface of the box in any suitable or convenient manner.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I desire to secure by Letters Patent, is:

1. In a junction box or the like, the combination with a pipe receiving exteriorly threaded nipple provided with a ring rereceiving nipple and an open ring interposed between the locking member and the said seat designed to encircle the pipe and to be forced into locking engagement with said seat and pipe.

2. In a junction box or the like, the combination with an exteriorly threaded pipe receiving nipple, provided with a beveled seat, a nut adapted to have screw-threaded engagement with said nipple and an open metallic ring interposed between the nut and the said seat, designed to encircle the pipe and to be forced into locking engagement with said seat and pipe.

3. In a device of the character described, the combination with an exteriorly threaded pipe receiving nipple, designed to receive the end of the pipe, a nut adapted to have screw-threaded engagement with said nipple, and an open ring interposed between the nut and the said nipple, designed to encircle the pipe and to be forced into locking engagement with said nipple and pipe.

4. In a device of the character described, the combination with a pipe receiving exteriorly threaded nipple provided with a tapered seat, a nut adapted to have screw-threaded engagement with said nipple and a ring interposed between the nut and the said seat, designed to encircle the pipe and to be forced into locking engagement with said seat and pipe.

5. In a junction box or the like, the combination with a pipe receiving exteriorly threaded nipple, having a longitudinal bore, and provided with a shoulder near one end thereof, and further provided with a beveled ring receiving seat at the other end thereof, a nut adapted to have screw threaded engagement with said nipple and an open metallic ring of irregular cross section interposed between the nut and the said seat, designed to encircle the pipe and to be forced into locking engagement with said seat and pipe.

This specification signed and witnessed this 26th day of April, 1919.

WALTER M. WALTMAN.

Witnesses:
   JOHN FOUNTAIN, Jr.,
   FRED'K C. FISCHER.